(No Model.)
C. M. STAFFORD.
VESSEL FOR LIQUIDS.
No. 551,797. Patented Dec. 24, 1895.
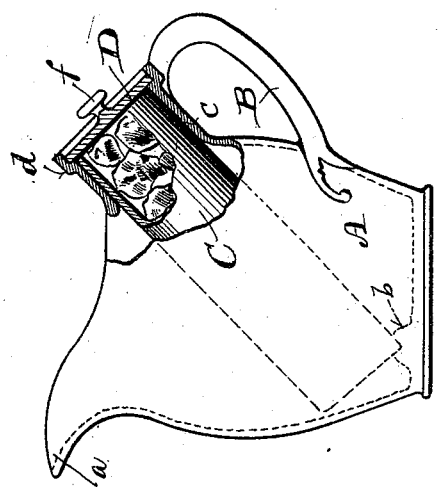
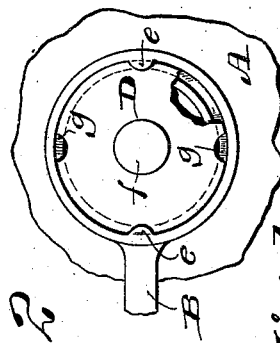
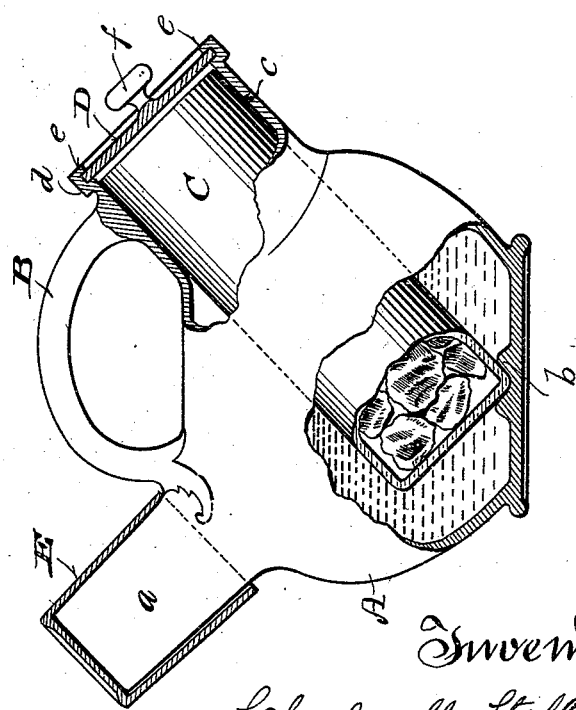
Witnesses
Geo. W. Young.
Henry Dankert
Inventor
Charles M. Stafford
By H. G. Underwood
Attorney

UNITED STATES PATENT OFFICE.

CHARLES M. STAFFORD, OF MILWAUKEE, WISCONSIN.

VESSEL FOR LIQUIDS.

SPECIFICATION forming part of Letters Patent No. 551,797, dated December 24, 1895.

Application filed November 26, 1894. Serial No. 530,068. (No model.)

*To all whom it may concern:*

Be it known that I, CHARLES M. STAFFORD, a citizen of the United States, and a resident of Milwaukee, in the county of Milwaukee, and in the State of Wisconsin, have invented certain new and useful Improvements in Vessels for Liquids; and I do hereby declare that the following is a full, clear, and exact description thereof.

My invention relates to vessels for holding liquids; and it consists in certain peculiarities of construction whereby an inner removable receptacle for ice or other refrigerating material may be supported within the main vessel in such manner as to guard against the escape of any portion of the contents of said inner receptacle when the main vessel is tipped or turned in the act of pouring, all as will be fully set forth hereinafter and subsequently claimed.

In the drawings, Figure 1 is a side elevation of one form of a device embodying my present improvements and partially broken away or with parts shown in section, the better to illustrate details of construction. Fig. 2 is a plan view, partially broken away, of the preferred lid or closure of the described inner receptacle. Fig. 3 is a side elevation, also partly broken away, illustrating my said invention applied to a different style of vessel.

In Fig. 1, I have illustrated my invention applied to a style of vessel which I term a "water-jug" and which comprises a body A, a pouring-spout $a$, and a handle B, placed in this instance above the top of the vessel, which latter is closed beneath the handle and has an opening $c$ to receive the fluid with which the body is filled, said opening $c$ being preferably cylindrical in form, so as to form a snug fit for the similarly-shaped inner receptacle C, which latter rests partly within a notch or seat $b$ formed upon or within the inner surface of the bottom of the body A. The mouth of this opening $c$ is further formed with an extension $d$ to receive a lid D to serve as a closure for the described inner receptacle C, which latter serves, as shown, as a practical closure for the body A, the pouring-spout $a$ being preferably closed by a tumbler E, supported thereon, so that when this form of the device is used in a sick-room, for instance, its contents will always be kept free from taint or contamination. The lid D may be held or secured in any suitable manner, as by the lugs $e$ projecting inwardly from the mouth extension $d$, said lid being adjusted to place by means of its knob $f$ and notches $g$, or the lid may simply rest within the mouth extension by its own weight and gravity, as shown in Fig. 3, wherein the same arrangement of inner receptacle C is shown applied to a pitcher of ordinary construction, save for the described cylindrical opening $c$ designed to receive the said receptacle C and support the upper end thereof.

Having thus described my invention, what I claim as new, and desire to secure by Letters Patent, is—

The herein described vessel for liquids, comprising an outer vessel having a pouring spout, and a seat or recess in the upper surface of its base and a closed inner receptacle for containing ice or other refrigerant, adapted to be readily removed from said outer vessel, when desired, but held stationary therein in engagement with said base-seat or recess while in use at such an angle to the pouring spout of the said main vessel as will prevent escape of the contents of said inner receptacle while the said outer vessel is being poured from or emptied and whereby the contents of the said vessel and inner receptacle are at all times kept separate without possibility of contact.

In testimony that I claim the foregoing I have hereunto set my hand, at Milwaukee, in the county of Milwaukee and State of Wisconsin, in the presence of two witnesses.

CHARLES M. STAFFORD.

Witnesses:
H. G. UNDERWOOD,
C. W. SCOTT.